July 5, 1932.   W. S. JONES   1,866,111
STEERING WHEEL HANDLE
Filed April 25, 1930
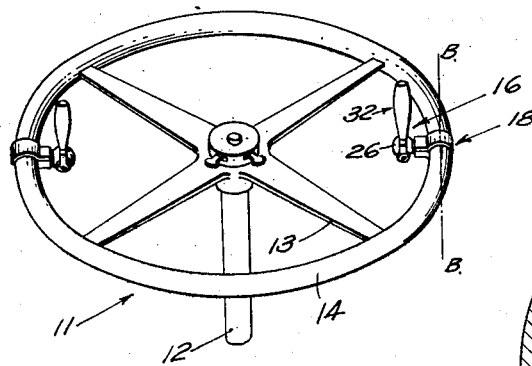
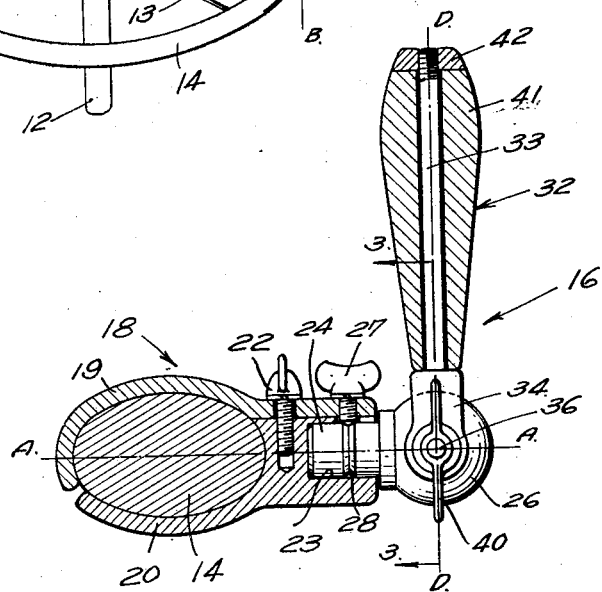
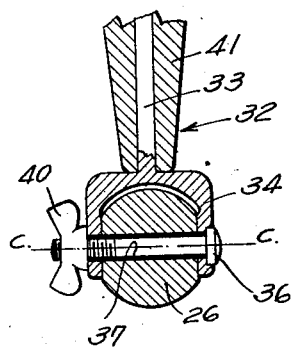
INVENTOR:
WINFIELD S. JONES,
By
ATTORNEY.

Patented July 5, 1932

1,866,111

UNITED STATES PATENT OFFICE

WINFIELD S. JONES, OF BREA, CALIFORNIA

STEERING WHEEL HANDLE

Application filed April 25, 1930. Serial No. 447,168.

My invention relates to a handle which may be secured to the steering wheel of an automobile or other vehicle so as to permit the hand of the driver to assume a natural position when driving the automobile. Steering wheel handles of this type are used to prevent the driver's hand and arm from becoming tired, as is the case when the hand grips the wheel in a cramped manner.

Heretofore, steering wheel handles have been provided with an arrangement whereby they may be secured to the rim of the steering wheel, a suitable means being provided to permit the handle to swing in a plane at right angles to a tangential axis to the steering wheel at the point of attachment of the steering wheel handle. Such an arrangement provides adjustment in only one plane and does not always permit of adjusting the handle to the most comfortable position.

It is an object of my invention to provide a steering wheel handle having a universal pivoting means so that the handle may be moved in all directions, thus permitting it to be adjusted to the most comfortable position for the driver.

Another object is to provide in a device of this class a novel universal pivoting means in which a handle of the steering wheel may be pivoted about a primary axis at an angle to a tangential axis to the steering wheel rim at the point of attachment of the steering wheel handle and may be pivoted about a secondary axis at an angle to the primary axis.

Steering wheel handles which are rigidly secured in one position to the steering wheel are objectionable as they are liable to become caught on the clothing of the driver or on other equipment and thus prevent the free rotation of the steering wheel.

A further object is to provide in a steering wheel handle a friction means for retaining the handle in any desired position, but permitting it to be moved out of position in case it is engaged by some member when the steering wheel is rotated.

A further object is to provide in a steering wheel handle a plurality of friction means for frictionally resisting the movement of the handle about the various axes, which friction means may be individually adjusted.

Further objects and advantages will be evident to those skilled in the art from the following description of a preferred form of my invention.

In the drawing:

Fig. 1 is a perspective view of a steering wheel showing the utility of a device of my invention.

Fig. 2 is a partially sectioned elevational view showing the arrangement of parts.

Fig. 3 is a sectional view taken on the line 3—3 of Fig. 2, showing a swivel joint of my invention.

Referring to Fig. 1, I show a conventional steering wheel 11 rotatable at the top of a steering wheel post 12, and having a spider 13 and a rim 14 attached to the spider 13. Adapted to be secured to the rim 14 of the steering wheel 11 are one or more steering wheel handles 16 of my invention, the details of one of which are clearly shown in Figs. 2 and 3.

Each of the steering wheel handles 16 includes an attachment means in the form of a clamp 18, composed of primary and secondary members 19 and 20 adapted to partially encircle the rim 14 of the steering wheel 11, and being clamped thereagainst by a thumb screw 22 passing through an opening in the primary member 19 and threaded in the secondary member 20. The secondary member 20 is provided with a bore or cylindrical opening 23 having an axis A—A formed at an angle to a tangential axis B—B of the rim 14 of the steering wheel 11 at the point of attachment of the steering wheel handle 16. Rotatable in the opening 23 is a pin 24 formed on a swivel member 26, the pin 24 being retained in the opening 23 by a thumb screw 27 threaded in the primary member 19 and engaging an annular groove 28 in the pin 24 so as to retain the pin 24 in the opening 23 and frictionally resist rotation of the pin 24 in the opening 23.

Pivoted to the member 26 is a handle 32 having a pin 33, formed at one end of which is a yoke 34 extending at either side of the swivel member 26 and being pivoted on a bolt 36 passing through an opening 37 in the yoke 34 and member 26, the axis C—C of the bolt 36 being at an angle to the axis A—A. A thumb nut 40 is threaded on the bolt 36 and provides for clamping the yoke 34 against the member 26 so as to vary the friction between the yoke 34 and member 26. Secured around the pin 33 and pivoted thereby is a grip 41 which is retained in place by a nut 42 threaded on the pin 33 and engaging the grip 41 so as to frictionally resist rotation of the grip 41 on the pin 33.

It should be noted that the handle 32 is rotatable about the axis A—A, which is at an angle to the tangential axis B—B on the steering wheel rim 14, and is also rotatable about the axis C—C, which is at an angle to the axis A—A. Furthermore, the grip 41 of the handle 32 is rotatable about the axis D—D of the pin 33. This provides a universal pivoting means for the handle 32 and permits the handle 32 to be moved in any direction comfortable to the hand of the driver. It further permits the steering wheel 11 to be completely rotated by the driver, the grip 41 rotating on the pin 33 and thus preventing rotation of the grip 41 in the hand of the driver.

It should also be noted that suitable friction means are provided for resisting rotation of the handle 32 about the axes A—A and C—C and rotation of the grip 41 about the axis D—D, these friction means being independently adjustable. When the friction means are properly adjusted, the handle 32 will be frictionally held in any desired position, but can be moved as desired by the driver. In case the steering wheel 11 is being rotated and one of the steering wheel handles 16 should become entangled in the clothing of the driver or should strike the driver's arm, the friction means allows the handle 32 to be moved out of the way of the driver's arm or to be disengaged from the driver's clothing.

My invention comprehends a ball and socket joint or any other universal pivoting means for attaching the handle 32 to the steering wheel 11 which allows the handle 32 to be moved in all directions and my invention should not be limited to the particular universal pivoting means shown, the form shown being preferred since it permits independent adjustment of the friction means which resists rotation about the various axes. Furthermore, I am not limited to the particular method of attaching the steering wheel handles 16 to the rim 14 of the steering wheel 11 as any suitable means may be employed for this purpose.

I claim as my invention:

1. In combination with a steering wheel: attachment means adapted to be attached to said steering wheel and providing an opening therein, said opening having an axis at an angle to a tangential axis of said steering wheel at the point of attachment of said attachment means; a member having a portion thereof rotatable in said opening; friction means for securing said portion of said member in said opening and frictionally resisting rotation of said member relative to said attachment means; a handle pivotally secured to said member; and friction means for frictionally resisting the movement of said handle relative to said member.

2. In combination with a steering wheel: attachment means adapted to be attached to said steering wheel and providing an opening therein, said opening having an axis at an angle to a tangential axis of said steering wheel at the point of attachment of said attachment means; a member having a portion thereof rotatable in said opening; friction means for securing said portion of said member in said opening and frictionally resisting rotation of said member relative to said attachment means; a pin pivotally secured to said member; friction means for frictionally resisting the movement of said pin relative to said member; a grip rotatable on said pin; and friction means for frictionally resisting rotation of said grip on said pin.

3. In combination with a steering wheel: attachment means secured to said steering wheel and providing an opening therein, said steering wheel having a tangential axis at the point of attachment of said attachment means; a member having a portion thereof rotatably secured in said opening; pivoting means carried by said member; a handle pivoted on said pivoting means, said handle being rotatable about a primary axis at an angle to said tangential axis and about a secondary axis at an angle to said primary axis; and friction means cooperating between said handle and said attachment means for restricting rotation of said handle about said primary and secondary axes.

In testimony whereof, I have hereunto set my hand at Los Angeles, California, this 19th day of April, 1930.

WINFIELD S. JONES.